United States Patent
Williams

(10) Patent No.: US 10,738,929 B2
(45) Date of Patent: Aug. 11, 2020

(54) SANITARY TEE OR WYE FITTING COMPONENT AND USE IN A DWV SYSTEM

(71) Applicant: Delve Holdings, LLC, Davison, MI (US)

(72) Inventor: Robert M. Williams, Longboat Key, FL (US)

(73) Assignee: Delve Holdings, LLC, Davison, MI (US)

(*) Notice: Subject to any disclaimer, the term of this patent is extended or adjusted under 35 U.S.C. 154(b) by 479 days.

(21) Appl. No.: 15/279,756

(22) Filed: Sep. 29, 2016

(65) Prior Publication Data

US 2018/0087703 A1 Mar. 29, 2018

(51) Int. Cl.
| | | |
|---|---|---|
| *F16L 41/08* | (2006.01) | |
| *F16L 47/02* | (2006.01) | |
| *F16L 41/00* | (2006.01) | |
| *B29C 65/00* | (2006.01) | |
| *B29C 65/48* | (2006.01) | |

(Continued)

(52) U.S. Cl.
CPC ........ *F16L 41/082* (2013.01); *B29C 65/4895* (2013.01); *B29C 66/02242* (2013.01); *B29C 66/1222* (2013.01); *B29C 66/1224* (2013.01); *B29C 66/5224* (2013.01); *B29C 66/52241* (2013.01); *B29C 66/53243* (2013.01); *B29C 66/73921* (2013.01); *F16L 41/004* (2013.01); *F16L 47/02* (2013.01); *B29C 66/71* (2013.01); *B29K 2027/06* (2013.01); *B29L 2031/246* (2013.01)

(58) Field of Classification Search
CPC ......... F16L 41/08; F16L 41/082; F16L 41/12; F16L 41/04; F16L 41/06; F16L 47/34; F16L 47/345

USPC .......................................... 285/197, 198, 199
See application file for complete search history.

(56) References Cited

U.S. PATENT DOCUMENTS 1,883,439 A * 10/1932 Adams .................. F16L 41/004
137/317
1,908,821 A * 5/1933 Cornell, Jr. ........... F16L 41/004
285/132.1

(Continued)

OTHER PUBLICATIONS

ASTM International, Designation: F1866-13; Standard Specification for Poly (Vinyl Chloride) (PVC) Plastic Schedule 40 Drainage and DWV Fabricated Fittings; Published Jan. 1, 2013.

(Continued)

*Primary Examiner* — Aaron M Dunwoody
(74) *Attorney, Agent, or Firm* — Harness, Dickey & Pierce, P.L.C.

(57) ABSTRACT

An internal boss can have an outer side surface shaped to match the bored opening of the Drain, Waste, and Vent (DWV) pipe, an inner side surface shaped to align with an interior pipe surface of the sanitary Tee or Wye fitting component, and an internal face surface of the boss extending between the side surfaces and shaped to align with an interior pipe surface of the DWV pipe when welded thereto. Snap-fit wings can hold the interior face surface of the sanitary Tee or Wye fitting component against an exterior face surface of the DWV pipe while the fitting component and DWV pipe are homogeneously weldable into a single DWV fitting using a solvent mixture including a common plastic material. Related methods and single homogeneous fittings are also provided.

15 Claims, 7 Drawing Sheets

(51) Int. Cl.
*B29K 27/06* (2006.01)
*B29L 31/24* (2006.01)

(56) References Cited

U.S. PATENT DOCUMENTS

| | | | | |
|---|---|---|---|---|
| 2,680,631 A * | 6/1954 | Smith | ............ | F16L 41/12 138/99 |
| 2,736,949 A * | 3/1956 | Kraemer | ............ | B21C 37/298 285/132.1 |
| 3,214,199 A * | 10/1965 | Brooks | ............ | F16L 41/08 285/189 |
| 3,232,645 A * | 2/1966 | Bucks | ............ | B21C 37/296 285/133.11 |
| 3,432,188 A * | 3/1969 | Turner | ............ | F16L 33/08 112/80.07 |
| 3,649,055 A * | 3/1972 | Nilsen | ............ | F16L 47/02 138/99 |
| 3,999,785 A * | 12/1976 | Blakeley | ............ | F16L 41/12 285/111 |
| 4,103,940 A * | 8/1978 | Bills | ............ | F16L 41/084 285/189 |
| 4,157,195 A * | 6/1979 | Costanzo | ............ | F16L 41/08 285/4 |
| 4,606,558 A * | 8/1986 | Davidson | ............ | B29C 65/4895 156/60 |
| 4,809,735 A * | 3/1989 | Volgstadt | ............ | F16L 47/345 137/318 |
| 4,966,397 A * | 10/1990 | McKinnon | ............ | F16L 47/30 285/197 |
| 5,020,832 A * | 6/1991 | Coblentz | ............ | F16L 47/30 285/133.11 |
| 5,056,704 A * | 10/1991 | Martin | ............ | B23K 33/006 228/173.4 |
| 5,125,431 A * | 6/1992 | Vogel | ............ | B29C 65/08 137/561 A |
| 5,788,414 A * | 8/1998 | Gordon | ............ | F16L 7/00 137/318 |
| 5,951,062 A * | 9/1999 | Miller | ............ | F16L 47/02 285/133.4 |
| 5,970,738 A * | 10/1999 | DeNolf | ............ | B01D 29/15 62/474 |
| 6,340,059 B1 * | 1/2002 | Bethea | ............ | A62C 31/02 169/16 |
| 6,499,769 B1 * | 12/2002 | Vieregge | ............ | B21D 39/044 285/197 |
| 6,623,045 B2 * | 9/2003 | Wurgler | ............ | E03C 1/0404 285/133.11 |
| 9,739,406 B2 * | 8/2017 | Ficker | ............ | F16L 41/00 |
| 2002/0000719 A1 * | 1/2002 | Kunsman | ............ | F16L 41/12 285/197 |
| 2003/0030275 A1 * | 2/2003 | Nicolini | ............ | A01J 5/044 285/197 |
| 2004/0256854 A1 * | 12/2004 | Haunhorst | ............ | B21C 37/292 285/133.11 |
| 2006/0108795 A1 * | 5/2006 | Manzon | ............ | F16L 41/082 285/197 |
| 2010/0276926 A1 * | 11/2010 | Perkovich | ............ | A62C 35/68 285/197 |
| 2010/0282337 A1 * | 11/2010 | Christodoulou | ............ | F16L 47/03 137/318 |
| 2011/0140413 A1 * | 6/2011 | Dittly | ............ | F16L 41/12 285/195 |
| 2013/0056104 A1 * | 3/2013 | Kriens, Jr. | ............ | F16L 41/004 138/99 |
| 2013/0134705 A1 * | 5/2013 | Ficker | ............ | F16L 41/00 285/201 |
| 2015/0300549 A1 * | 10/2015 | Cheng-Sheng | ............ | F16L 41/12 285/197 |
| 2017/0009924 A1 * | 1/2017 | Madsen | ............ | F16L 41/06 |

OTHER PUBLICATIONS

PlumbingSupply.com; Saddle tees and Clamp-It™ saddles; PVC Saddle Tees; original publication date unknown, downloaded from the internet on Jul. 11, 2016 at https://www.plumbingsupply.com/saddle.html.

Harrison Machine & Plastic Corporation; Harrison Superduct® PVC Duct Pipe; Plastic Pipe Fittings; original publication date unknown, downloaded from the internet on Jul. 11, 2016 at http://www.harrisonplastic.com/fittings.html.

FlexPVC®, PVC Snap Tee Dura; original publication date unknown, downloaded from the internet on Jul. 13, 2016 https://flexpvc.com/cart/agora.cgi?p=PVC-Fittings-Tees-Snap-Pressure&p_id=463-020&xm=on&ppinc=detail.

ASTM International, Designation: F1866-18; "Standard Specification for Poly (Vinyl Chloride) (PVC) Plastic Schedule 40 Drainage and DWV Fabricated Fittings"; Published Mar. 2018.

* cited by examiner

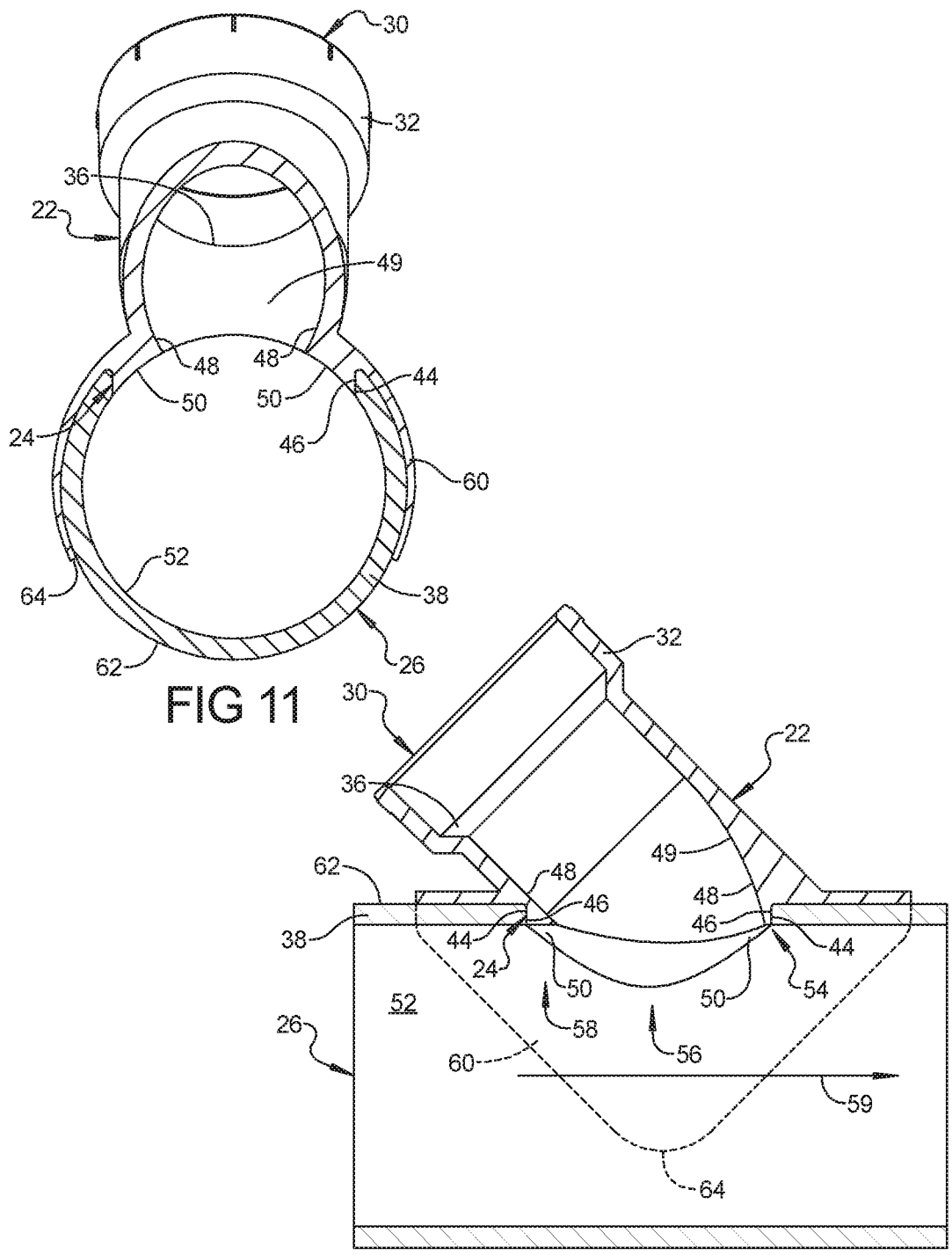

SANITARY TEE OR WYE FITTING COMPONENT AND USE IN A DWV SYSTEM

The present disclosure relates to the use of sanitary Tee and Wye fitting components in drain, waste, and vent (DWV) systems.

BACKGROUND

This section provides background information related to the present disclosure which is not necessarily prior art.

Drain, waste, and vent (DWV) systems are used to move waste liquids and solids out of bathrooms and kitchens and into sanitary sewers by gravity. In addition to vent pipes, the drain or waste pipes of a DWV system can include a main and secondary stacks and smaller drain pipes coupled together. Historically, such DWV systems have used a combination of pipes of various sizes made from a variety of different materials joined together by many different methods.

Today, virtually all plumbing codes require that all pipes that are not exposed be permanently joined. Copper DWV systems use solder that can be reheated and cast iron "no-hub" systems use clamps that can be loosened; and therefore, are not actually permanently joined. Only thermoplastic pipe systems using compatible solvent mixtures can truly be considered to create a permanent joint that cannot be undone or reversed. Nevertheless, plumbing codes have refused to endorse the use of fitting components in DWV systems, primarily because they add appendages to existing systems and/or are not permanent connections.

Because DWV systems rely upon gravity flow and move both solid and liquid waste, they can be prone to clogging. Modern plumbing codes manage this problem by requiring access fittings such as clean-outs for unclogging the pipes. The inventors have realized that existing sanitary Tee and Wye fitting components can exacerbate this clogging tendency because they cause flow disruptions or disturbances at the resulting pipe intersection.

SUMMARY

This section provides a general summary of the disclosure, and is not a comprehensive disclosure of its full scope or all of its features.

In accordance with one aspect of the present disclosure, a sanitary Tee or Wye fitting component for joining into an opening bored into a DWV pipe is provided. The sanitary Tee or Wye fitting component and the DWV pipe can be made of a common plastic material. The sanitary Tee or Wye fitting component can include an internal boss extending from an interior face surface. The internal boss can have an outer side surface shaped to match the bored opening of the DWV pipe, an inner side surface aligned with an internal pipe surface of the sanitary Tee or Wye fitting component, and an internal face surface of the boss extending between the side surfaces and shaped to align with an interior pipe surface of the DWV pipe when welded thereto. A pair of snap-fit wings can be arrayed to hold the interior face surface of the sanitary Tee or Wye fitting component against an exterior face surface of the DWV pipe. The sanitary Tee or Wye fitting component and DWV pipe are homogeneously weldable into a single DWV fitting, when held together by the snap-fit wings, using a solvent mixture including the common plastic material dissolved in solvents applied between the interior face surface of the sanitary Tee or Wye fitting component and the exterior face surface of the DWV pipe.

In accordance with another aspect of the present disclosure, a single homogeneous DWV fitting can include a DWV pipe made of a plastic material and having an opening bored into a wall thereof. A sanitary Tee or Wye fitting component can be made of the plastic material and can include an internal boss extending from an interior face surface. The internal boss can have an outer side surface shaped to match the bored opening of the DWV pipe, an inner side surface aligned with an interior pipe surface of the sanitary Tee or Wye fitting component, and an internal face surface of the boss extending between the side surfaces and shaped to align with an interior pipe surface of the DWV pipe when welded thereto. A pair of snap-fit wings can be arrayed to hold the interior face surface of the sanitary Tee or Wye fitting component against an exterior face surface of the DWV pipe. A solvent mixture including the plastic material dissolved in solvents can be applied between the interior face surface of the sanitary Tee or Wye fitting component and the exterior face surface of the DWV pipe. The solvent mixture can homogeneously weld the sanitary Tee or Wye fitting component and DWV pipe into the single homogeneous fitting as the interior face surface of the sanitary Tee or Wye fitting component is held against the exterior face surface of the DWV pipe, with the solvent mixture therebetween, by the snap-fit wings.

In accordance with yet another aspect of the present disclosure, a method of forming single homogeneous DWV fitting from a vertical DWV stack and at least one sanitary Tee or Wye fitting component made of a common plastic material is provided. For each sanitary Tee or Wye fitting component, the method can include boring an opening in a wall of the vertical DWV stack. An internal boss extending from an interior face surface of the sanitary Tee or Wye fitting component can be positioned into the bored opening of the vertical DWV stack to cause (1) an outer side surface of the internal boss to mate with a side edge of the bored opening of the vertical DWV stack, and (2) an internal face surface of the boss adjacent the outer side surface to align with an interior pipe surface adjacent the side edge of the bore of the vertical DWV stack. A solvent mixture including the plastic material dissolved in solvents can be applied to the interior face surface of the sanitary Tee or Wye fitting component, or to the exterior face surface of the vertical DWV stack, or to both. A pair of snap-fit wings of the sanitary Tee or Wye fitting component can be coupled around the DWV pipe to hold the interior face surface of the sanitary Tee or Wye fitting component against the exterior face surface of the vertical DWV stack while the solvent mixture welds the sanitary Tee or Wye fitting component and vertical DWV stack into the single homogeneous fitting.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 11 is a transverse cross-section of the example sanitary Wye fitting component embodiment of FIG. 9 coupled to a DWV pipe.

FIG. 12 is a longitudinal cross-section of the example sanitary Wye fitting component embodiment of FIG. 9 coupled to a DWV pipe.

Corresponding reference numerals indicate corresponding parts throughout the several views of the drawings.

DETAILED DESCRIPTION

Example embodiments will now be described more fully with reference to the accompanying drawings.

Figure 1:
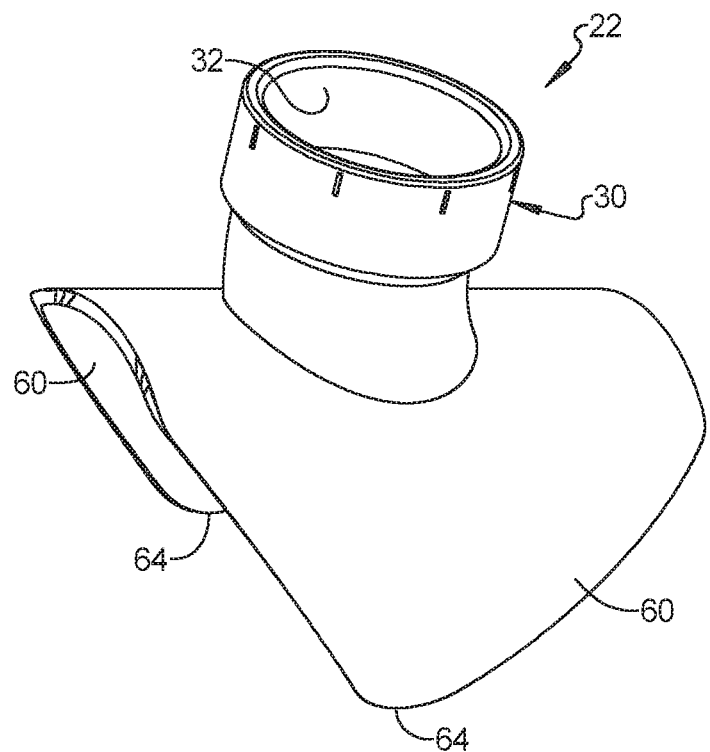
FIG. 1 is a perspective view of an example of a sanitary Tee fitting component embodiment in accordance with the present disclosure.
Figure 2:
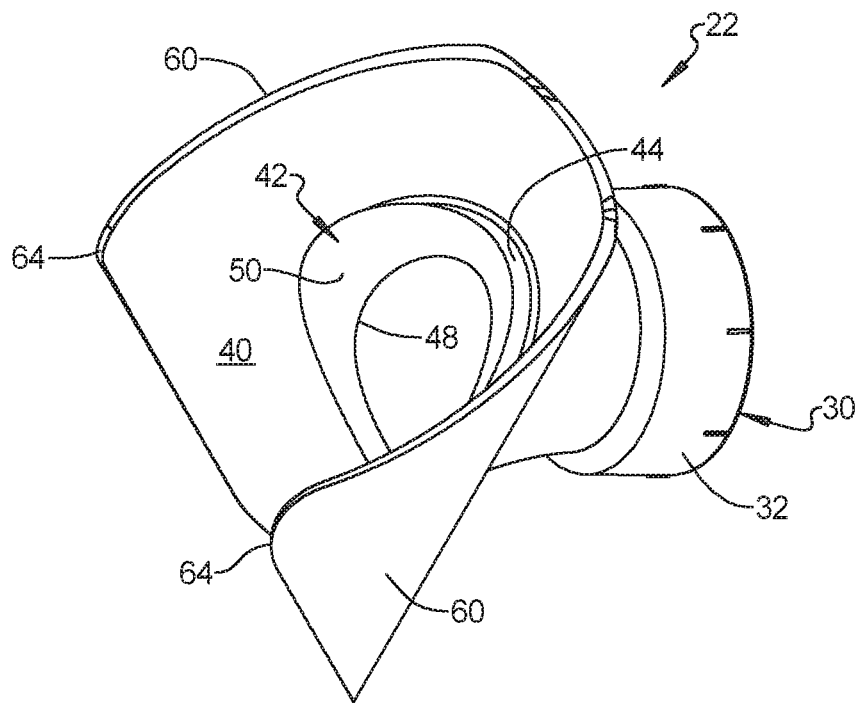
FIG. 2 is another perspective view of the example sanitary Tee fitting component embodiment of FIG. 1.
Figure 3:
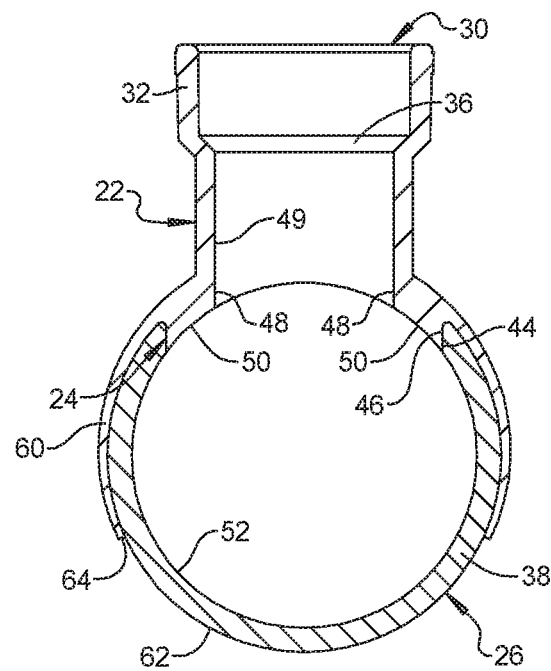
FIG. 3 is a transverse cross-section of the example sanitary Tee fitting component embodiment of FIG. 1 coupled to a DWV pipe.
Figure 4:
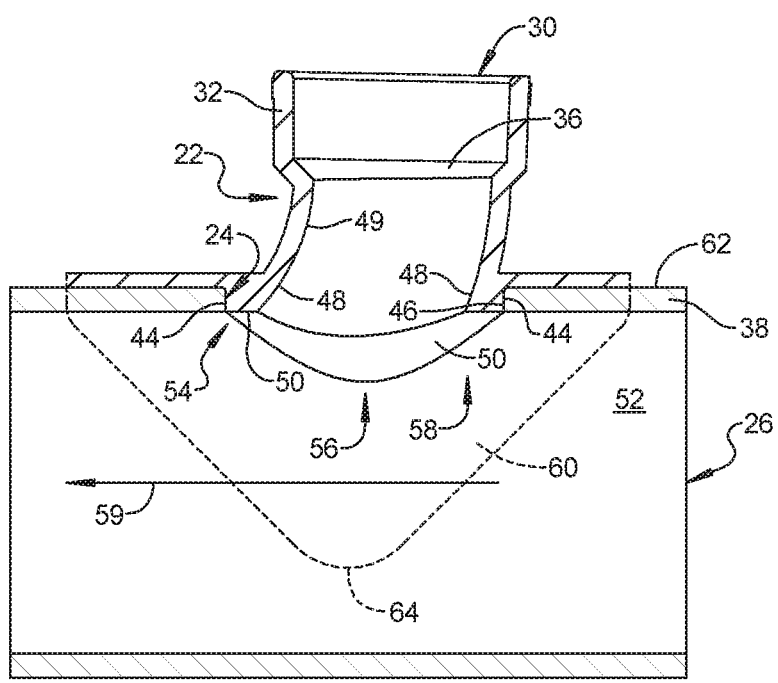
FIG. 4 is a longitudinal cross-section of the example sanitary Tee fitting component embodiment of FIG. 1 coupled to a DWV pipe.
Figure 5:
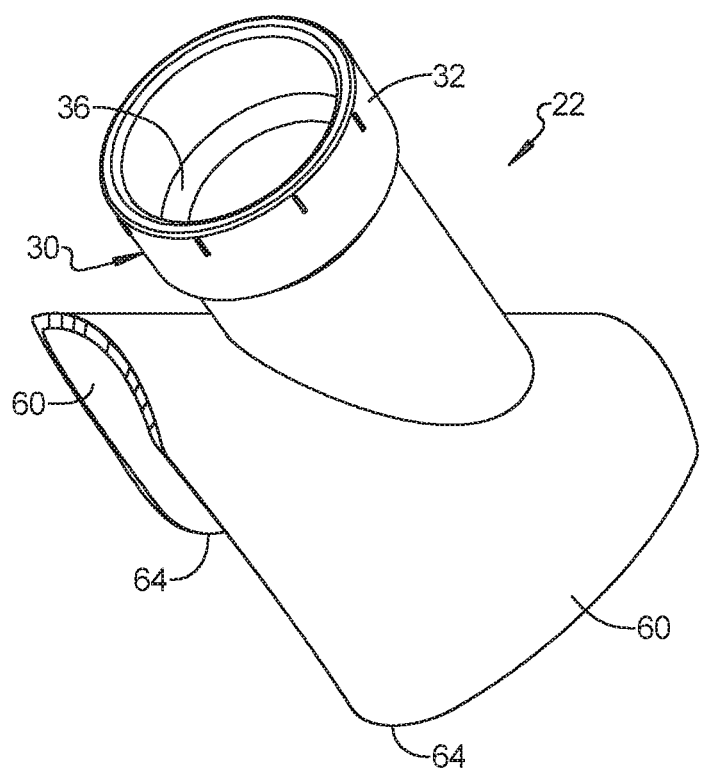
FIG. 5 is a perspective view of an example of a Wye fitting component embodiment in accordance with the present disclosure.
Figure 6:
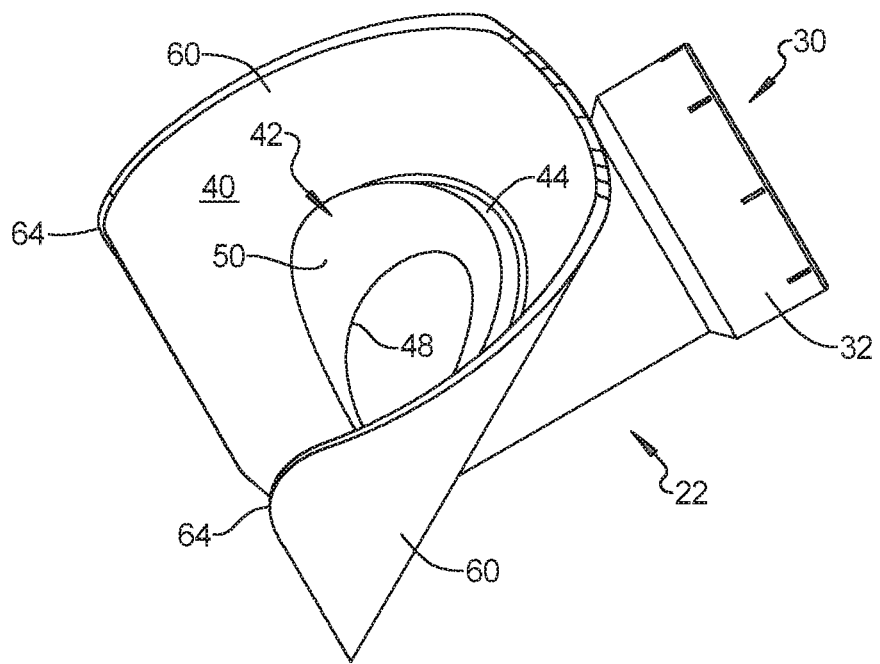
FIG. 6 is another perspective view of the example Wye fitting component embodiment of FIG. 5.
Figure 7:
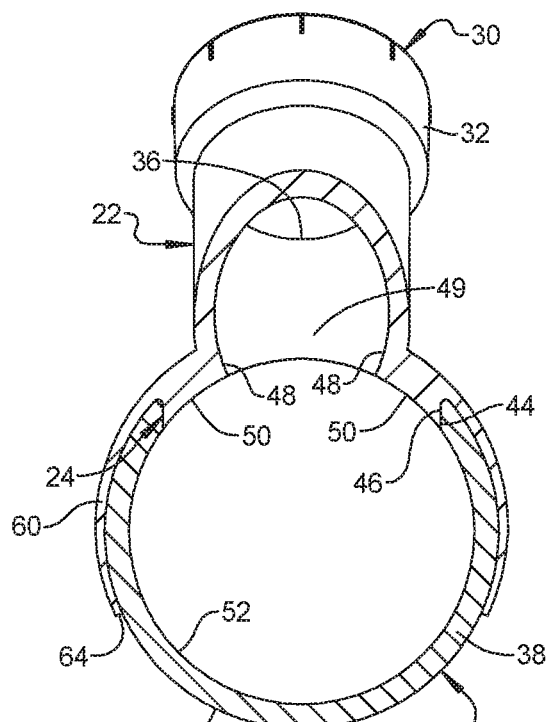
FIG. 7 is a transverse cross-section of the example Wye fitting component embodiment of FIG. 5 coupled to a DWV pipe.
Figure 8:
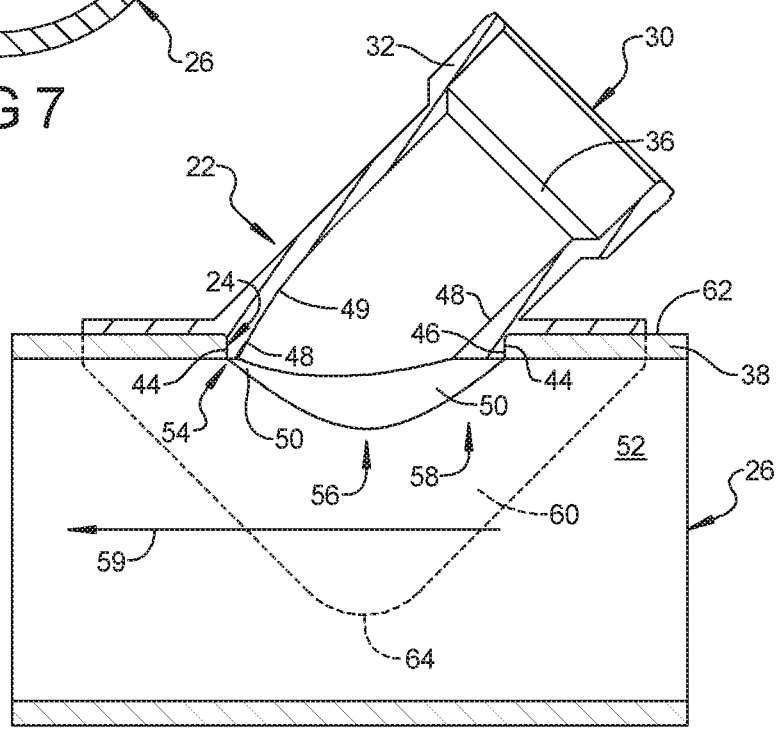
FIG. 8 is a longitudinal cross-section of the example Wye fitting component embodiment of FIG. 5 coupled to a DWV pipe.
Figure 9:
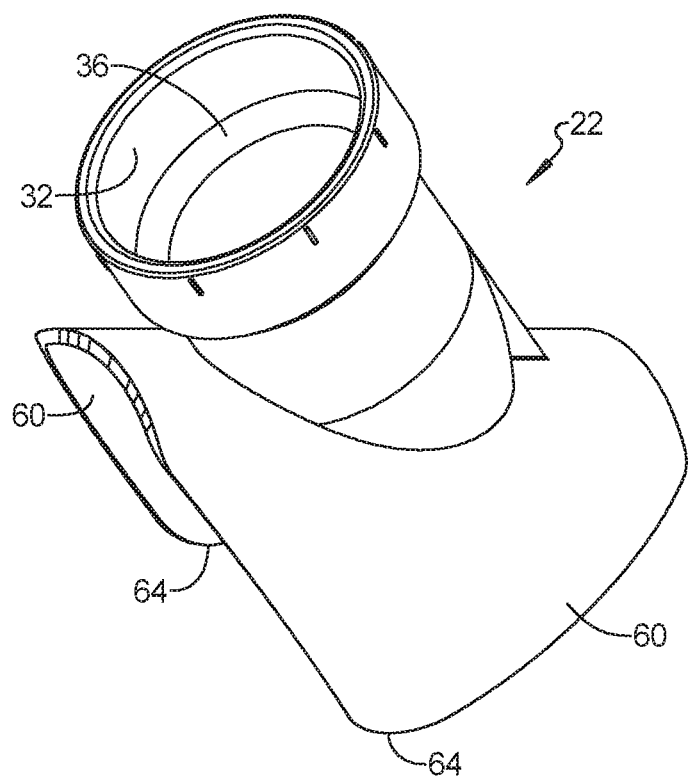
FIG. 9 is a perspective view of another example of a sanitary Wye fitting component embodiment in accordance with the present disclosure.
Figure 10:
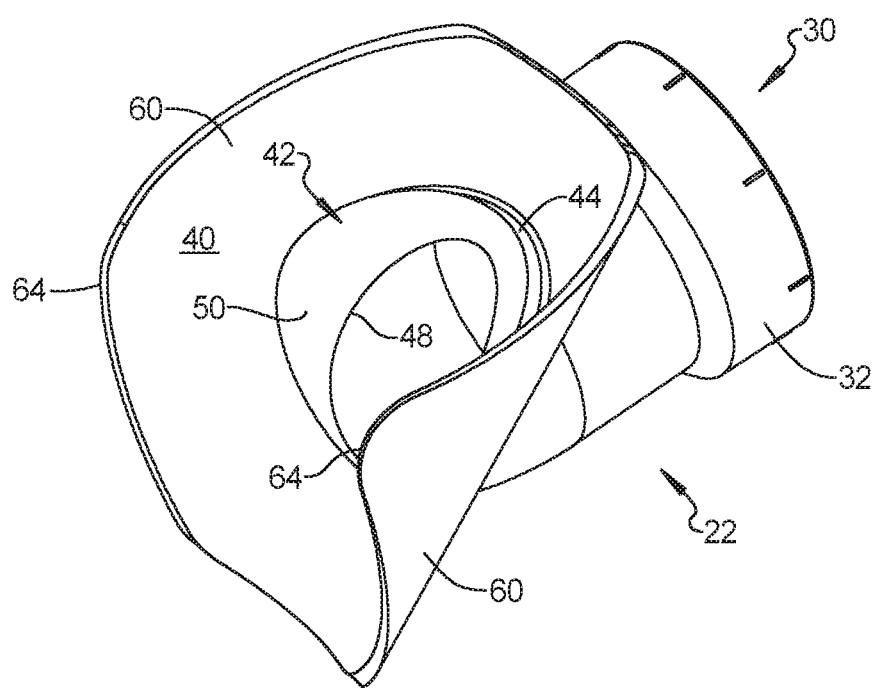
FIG. 10 is another perspective view of the example sanitary Wyefitting component embodiment of FIG. 9.
Figure 13:
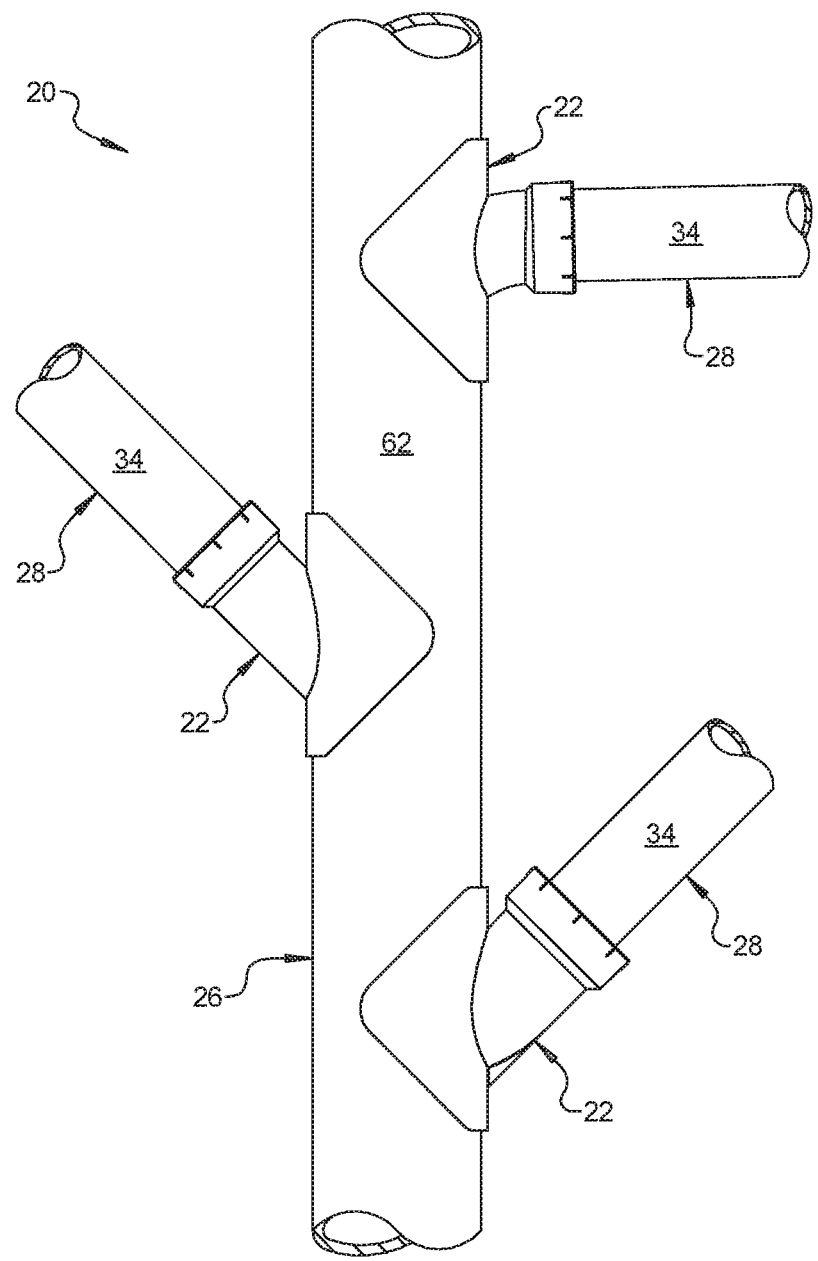
FIG. 13 is a side elevation view of a portion of an example DWV system incorporating multiple sanitary Tee and Wye fitting components.

FIGS. 1-13 illustrate various example embodiments of sanitary Tee and Wye fitting components 22 for use in a drain, waste, and vent (DWV) system 20 in accordance with the present disclosure. Specifically, FIGS. 1-4 illustrate an example sanitary Tee fitting component 22 embodiment, FIGS. 5-8 illustrate an example Wye fitting component 22 embodiment, and FIGS. 9-12 illustrate another example sanitary Wye fitting component 22 embodiment. FIG. 13 illustrates a portion of an example DWV system 20 incorporating the fitting components 22 of the present disclosure. Throughout the figures, identical reference numerals are used to identify corresponding features of the different embodiments.

The sanitary Tee or Wye fitting component 22 can be joined into an opening 24 bored into a DWV pipe 26. DWV pipes 20 can include main and secondary vertical stacks that collect water and waste from various smaller drain pipes 28 that typically feed and ultimately enter such DWV stack pipes 26 from a side. In some cases, such DWV stack pipes 26 can be formed of a plurality of individual original single piece lengths of pipe with complete Tee or Wye couplings (not shown) required to connect the individual lengths of pipe of such DWV stack pipes 26 together. The location of these connections, and the lengths of individual DWV stack pipes 26 between them, is determined by the types and locations of plumbing fixtures in the building. This can mean that the types and locations of the fixtures throughout the building must be known before such DWV stack pipes 26 can be designed and installed. This approach also has a relatively large number of pipe connections because of the need to couple four different pipe components together at every complete Tee or Wye coupling (not shown).

As illustrated in FIG. 13, such DWV stack pipes 26 can alternatively be formed of an original single piece length of pipe with Tee or Wye fitting components used to connect the various smaller feeder drain pipes that typically feed into such DWV stack pipes 26. As discussed below, these fitting components 22 can be positioned anywhere along the original single piece length of pipe 26 after the DWV stack has been installed. Thus, the DWV stack pipe 26 can be installed within the building prior to knowing the types and locations of all the plumbing fixtures within the building. This approach also includes a relatively small number of pipe connections because of the need to couple only three different pipe components together at each Tee or Wye fitting component 22. This can result in a significant reduction in the number of adjacent part connections over the length of an entire DWV stack pipe 26 or system 20 of a building.

Both the DWV pipes 26, 28 and the sanitary Tee and Wye fitting components 22 can be made of a common plastic material. For example, both the DWV pipes 26, 28 and the fitting components 22 can be made of polyvinyl chloride (PVC) or of acrylonitrile butadiene styrene (ABS). To join such components together, a solvent mixture can be applied to the surfaces to be joined. The solvent mixture can include the same common plastic material. Thus, when the solvents evaporate, a permanent homogeneous connection results from the components being chemically welded together. As a result of such a homogeneous connection, this chemical welding cannot be reversed or undone. In addition, the components that have been homogeneously joined together using this process become, for all intents and purposes, a single fitting. This can enable an entire DWV stack 26 and connecting adjacent feeder pipes 28, if not the entire DWV system 20, to become a single-piece homogeneous fitting, for all intents and purposes.

The fitting components themselves 22 can include an inlet coupling 30 for chemically welding to adjacent feeder DWV drain pipe 28. In the illustrated examples, the inlet coupling 30 includes an outer collar 32 sized to be chemically welded to an exterior surface 34 of the adjacent feeder DWV drain pipe 28. This outer collar 32 can include an annular stop surface 36 against which an end of the adjacent feeder DWV drain pipe 28 can engage, so that no flow disturbances occur at this inlet junction. When coupled thereto, the adjacent feeder DWV drain pipe 28 drains into the fitting component 22 through the fitting component inlet 30.

To chemically weld the fitting component 22 to a downstream DWV pipe, such as a DWV stack pipe 26, a drill with an appropriately sized circular bit or boring tool is used to bore a hole or opening 24 into the side wall 38 of the downstream DWV pipe 26 at a selected location after the type and location of the relevant plumbing fixture(s) are known. Although the resulting opening 24 is created by a circular boring tool, the removed material has an oval or ellipsoid shape due to the curved nature of the side wall 38 of the downstream DWV pipe 26.

An interior face surface 40 of the fitting component 22 has an internal boss 42 extending therefrom. As in the illustrated embodiments, the internal boss 42 can have an outer side surface 44 that is shaped to match, conform to, or align with, the surface or side edge 46 created by the bored opening 24 through the wall 38 of the downstream DWV pipe 26. When the fitting component 22 is fit to the downstream DWV pipe 26, the outer side surface 44 can engage or mirror the immediately adjacent bore-created side edge 46. This can permit these surfaces, 44 and 46, to be chemically welded to each other, and can minimize or eliminate flow disturbances at the junction of these surfaces, 44 and 46. This can also effectively eliminate any gaps between the outer side surface 44 and the bore side edge or surface 46 in the wall 38 of the downstream pipe 26. Thus, unnecessary abrupt transitions that provide potential flow disruptions at the junction of the fitting component 22 interior with the internal diameter of the downstream DWV pipe 26 can be effectively eliminated.

As in the illustrated embodiments, the internal boss 42 can have an inner side surface 48 that is aligned with, and extends smoothly from the adjacent internal pipe surface 49 of the sanitary Tee or Wye fitting component 22 extending from the adjacent feeder DWV drain pipe 28. Thus, the inner side surface 48 of the internal boss 42 maintains a smooth interior surface extension of the inner pipe surface 49, avoiding abrupt transitions that provide unnecessary potential flow disruptions leading to the interior of the downstream DWV pipe 26.

The internal boss 42 can additionally have an internal face surface 50 extending between the outer side surface 44 and inner side surface 48. As in the illustrated embodiments, this internal face surface 50 of the boss 42 can be shaped to match, conform to, align with, or is flush with the interior pipe face surface 52 of the downstream DWV pipe 26. In other words, the internal face surface 50 of the boss 42 maintains, or provides a continuation of, the internal diameter of the downstream DWV pipe 26. Thus, the internal face surface 50 of the boss 42 can avoid extending into or unnecessarily receding from the interior diameter of the downstream DWV pipe 26.

In essence, the internal boss 42 can be shaped to replace the oval or ellipsoid shaped portion of the side wall 38 of the downstream DWV pipe 26 that was removed to create the side wall opening 24 by the circular boring tool, except that portion corresponding to or matching, conforming to, or aligning with the internal diameter of the sanitary Tee or Wye fitting component 22 extending from the adjacent feeder DWV drain pipe 28. In addition to avoiding the unnecessary abrupt transitions and gaps discussed above, because the internal boss 42 provides no protrusion into, or unnecessary missing side wall recess or gap, any impact on the flow of water and waste traveling down the downstream pipe can be effectively minimized or eliminated.

Consequently, the internal boss 42 can be shaped so that there are no flow disruptions due to resulting gaps, mismatches, or misalignments between adjacent surfaces, like those that would result from a fitting component with no internal boss, or with a constant width annular internal boss, or with an internal boss having a planar internal face surface.

As noted above, the internal boss 42 can effectively replace an oval or ellipsoid portion of the pipe wall 38 that is removed by boring the opening 24 therein. Thus, the thickness or width of the internal boss 42 or internal face surface 50 extending between the outer side surface 44 and inner side surface 48 is not constant around its entire 360 degrees. As used herein, the "downstream side" refers to the side or portion of the internal boss 42 around its 360 degrees that is specifically designed to be placed at the downstream most position or orientation of the DWV pipe 26. The direction of flow in the DWV pipe 26 is indicated by the arrows 59 in FIGS. 4, 8, and 12. Likewise, the "upstream side" is the side or portion of the internal boss 42 that is specifically designed to be placed at the upstream most position or orientation of the DWV pipe 26. This is opposite to, or 180 degrees from, the downstream side. The midpoint(s) is about half-way between, or 90 degrees from, the downstream and upstream sides.

The boss 42 or its internal face surface 50 can have a width from the outer side surface 44 to the inner side surface 48 that is less or thinner at both a downstream side 54 and an upstream side 58 than it is at a midpoint 56 between the downstream side 48 and the upstream flow side 58. As shown best in FIGS. 8 and 12, the width of the internal boss 42 or internal face surface 50 can be thinnest at the downstream side 54, and can be thinner than at the upstream side 58.

Similarly, the boss 42 or its internal face surface 50 can have a width from the outer side surface 44 to the inner side surface 48 that is greatest or thickest at a midpoint 56 between the downstream side 48 and the upstream flow side 58, and that can be greater or thicker at the midpoint 56 than at both a downstream side 54 and an upstream side 58. As shown best in FIGS. 8 and 12, the width of the internal boss 42 or internal face surface 50 can be wider at the upstream side 58 than at the downstream side 48.

The interior face surface 40 of the fitting component 22 can be at least partially provided by a pair of cooperating snap-fit wings 60. These snap-fit wings 60 are arrayed to hold the interior face surface 40 of the fitting component 22 against the exterior face surface 62 of the DWV pipe 26. The snap-fit wings 60 can each have a generally triangular shape. As should be apparent from FIG. 13, such triangular shaped wings 60 can save materials and costs, and can also minimize positional limitations of the fitting components 22 by enabling adjacent fitting components 22 to be coupled to the DWV pipe 26 closer to each other than, for example, if the snap-fit wings had a generally rectangular shape.

The solvent mixture can be applied to the interior face surface 40, to the exterior face surface 62, or both. The fitting component 22 can be oriented relative to the flow direction of the DWV pipe 26. Then the distal ends 64 of the snap-fit wings 60 can be pressed or engaged against the exterior face surface 62 of the DWV pipe 26, initially spreading them apart. With continued pressure, the snap-fit wings 60 will eventually grasp and pull the interior face surface 40 and the exterior face surface 62 toward each other.

The corresponding non-circular shape of the outer side surface 44 of the boss 42 and the surface 46 of the bored opening 24 in the pipe wall 38 helps insure there is no positional misalignment between the bored opening 24 and the proper upstream/downstream positioning of the fitting component 22 relative to the DWV pipe 26. When properly mated, the snap-fit wings 60 can be sufficient alone to hold the interior face surface 40 and the exterior face surface 62 while the solvent mixture homogeneously joins the DWV pipe 26 and fitting component 22 into a single homogeneous fitting. Thus, no additional coupling components, such as straps are required.

Orienting and snap-fitting the interior face surface 40 of the fitting component 22 against the exterior face surface 62 of the DWV pipe 26 with the internal boss 42 properly positioned and fitted within the bore opening 26 can include positioning the outer side surface 44 of the internal boss 42 that is shaped to match the side edge or surface 46 of the bored opening 24 of the DWV pipe 26. In addition, the internal face surface 50 of the boss 42 adjacent the outer side surface can be aligned with the interior pipe face surface 52 adjacent the surface 46 of the bored opening 24 of the DWV pipe 26.

Further, a thinnest portion of the internal face surface 50 can be positioned at the downstream side 54 of the pipe 26. A widest portion of the internal face surface 50 can be positioned at a midpoint 56 between the downstream side 54 and the opposite upstream side 58. A thinner portion of the internal face surface 50 can be positioned at the downstream side 54 than at the upstream side 58. Alternatively, the width of the internal face surface 50 positioned at both the downstream side 54 and the opposite upstream side 58 can be substantially the same as each other. Similarly, the widths of the internal face surface 50 positioned on both sides thereof at the midpoint 56 can be substantially the same as each other.

The foregoing description of the embodiments has been provided for purposes of illustration and description. It is not intended to be exhaustive or to limit the disclosure. In some example embodiments, well-known processes, well-known device structures, and well-known technologies are not described in detail. It will be apparent to those skilled in the art that specific details need not be employed, that example embodiments may be embodied in many different forms. For example, individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A single homogeneous Drain, Waste, and Vent (DWV) fitting comprising:
    a DWV pipe made of a plastic material and having an opening bored into a wall thereof,
    a sanitary Tee or Wye fitting component made of the plastic material and comprising:
        an internal boss extending from an interior face surface, the internal boss having an outer side surface shaped to match the bored opening of the DWV pipe, an inner side surface aligned with an interior pipe surface of the sanitary Tee or Wye fitting component orientable to provide directional flow into the DWV pipe, and an internal face surface of the boss extending between the side surfaces and shaped to align with an interior pipe surface of the DWV pipe when welded thereto, and a width of the boss from the outer to inner side surfaces along the internal face being different at different points around the circumference of the boss as a result of the interior pipe surface being orientable to provide directional flow into the DWV pipe;
        a pair of snap-fit wings arrayed to hold the interior face surface of the sanitary Tee or Wye fitting component against an exterior face surface of the DWV pipe;
    wherein the sanitary Tee or Wye fitting component and DWV pipe are weldable into the single homogeneous fitting using a solvent mixture including the plastic material dissolved in solvents applied between the interior face surface of the sanitary Tee or Wye fitting component and the exterior face surface of the DWV pipe as the interior face surface of the sanitary Tee or Wye fitting component is held against the exterior face surface of the DWV pipe by the snap-fit wings until the solvent evaporates.

2. The single homogeneous DWV fitting of claim 1, wherein the sanitary Tee or Wye fitting component comprises a plurality of sanitary Tee or Wye fitting components, and the DWV pipe is a vertical stack, and wherein each of the sanitary Tee or Wye fitting components joins a DWV drain pipe to the vertical stack such that every single DWV drain pipe joined to the vertical stack is joined using one of the sanitary Tee or Wye fitting components.

3. The single homogeneous DWV fitting of claim 2, wherein the vertical stack is entirely formed of an original single-piece length of pipe.

4. The single homogeneous DWV fitting of claim 1, wherein the internal face surface of the boss has a width from the outer to inner side surfaces that is thinner at a downstream side than at an opposite upstream side therefrom.

5. The single homogeneous DWV fitting of claim 1, wherein the internal face surface of the boss has a width from the outer to inner side surfaces that is thickest at a midpoint between a downstream side and an opposite upstream side therefrom.

6. The single homogeneous DWV fitting of claim 1, wherein the internal face surface of the boss has a width from the outer to inner side surfaces that is thinner at a downstream side than at an opposite upstream side therefrom, and the width is thickest at a midpoint between the downstream side and the opposite upstream side.

7. The single homogeneous DWV fitting of claim 1, wherein the snap-fit wings have a generally triangular shape.

8. The single homogeneous DWV fitting of claim 1, wherein the common plastic material is selected from one of polyvinyl chloride (PVC) and acrylonitrile butadiene styrene (ABS).

9. A method of forming a single homogeneous Drain, Waste, and Vent (DWV) fitting from a DWV pipe and at least one sanitary Tee or Wye fitting component made of a common plastic material; for each sanitary Tee or Wye fitting component, the method comprising:
    boring an opening in a wall of the DWV pipe;
    positioning an internal boss extending from an interior face surface of the sanitary Tee or Wye fitting component into the bored opening of the DWV pipe in an orientation to provide directional flow into the DWV pipe and to cause (1) an outer side surface of the internal boss to mate with a side edge of the bored opening of the DWV pipe, and (2) an internal face surface of the boss adjacent the outer side surface to align with an interior pipe surface adjacent the side edge of the bore of the DWV pipe and (3) a first portion of the internal boss having a first thickness along the internal face surface to be located at a downstream side of the DWV pipe and a second portion of the internal boss having a second thickness along the internal face surface that is different from the first thickness to be located at a midpoint between the downstream side and an upstream side of the DWV pipe;
    applying a solvent mixture including the plastic material dissolved in solvents to the interior face surface of the sanitary Tee or Wye fitting component, or to the exterior face surface of the DWV pipe, or to both;
    coupling a pair of snap-fit wings of the sanitary Tee or Wye fitting component around the DWV pipe to hold the interior face surface of the sanitary Tee or Wye fitting component against the exterior face surface of the DWV pipe while the solvent mixture welds the sanitary Tee or Wye fitting component and DWV pipe into the single homogeneous fitting.

10. The method of forming the single homogeneous DWV fitting of claim 9, wherein the DWV pipe is a vertical DWV stack and the at least one sanitary Tee or Wye fitting component comprises every single coupling of an adjacent drain pipe into the vertical DWV stack.

11. The method of forming the single homogeneous DWV fitting of claim 10, further comprising forming the vertical DWV stack entirely of an original single-piece length of pipe.

12. The method of forming the single homogeneous DWV fitting of claim 9, wherein positioning the internal boss further comprises positioning a thinnest portion of the internal face surface toward at a downstream side.

13. The method of forming the single homogeneous DWV fitting of claim 9, wherein positioning the internal boss further comprises positioning a widest portion of the internal boss along the internal face surface at a midpoint between a downstream side and an opposite upstream side therefrom.

14. The method of forming single homogeneous DWV fitting of claim 9, wherein positioning the internal boss further comprises positioning a thinnest portion of the internal boss along the internal face surface toward a downstream side and positioning a widest portion of the internal boss along the internal face surface at a midpoint between the downstream side and the opposite upstream side of the DWV pipe.

15. The single homogeneous DWV fitting of claim 9, wherein coupling a pair of snap-fit wings comprises opening the snap-fit wings by engaging distal ends of generally triangular shaped snap-fit wings against an exterior surface of the DWV pipe.

\* \* \* \* \*